(12) United States Patent
Bonnier et al.

(10) Patent No.: US 9,458,039 B2
(45) Date of Patent: Oct. 4, 2016

(54) PRODUCTION PROCESS FOR A ZINC ENRICHED DRINKING WATER, COMPOSITION AND PACKAGED WATER

(71) Applicant: NESTEC S.A., Vevey (CH)

(72) Inventors: Sylvain Bonnier, Vittel (FR); Eric Marchal, Vittel (FR); Renaud Sublet, Vittel (FR)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 14/385,202

(22) PCT Filed: Feb. 26, 2013

(86) PCT No.: PCT/EP2013/053756
§ 371 (c)(1),
(2) Date: Sep. 15, 2014

(87) PCT Pub. No.: WO2013/127754
PCT Pub. Date: Sep. 6, 2013

(65) Prior Publication Data
US 2015/0284273 A1    Oct. 8, 2015

(30) Foreign Application Priority Data
Feb. 28, 2012    (EP) .................................... 12157303

(51) Int. Cl.
| | |
|---|---|
| *A23L 2/68* | (2006.01) |
| *C02F 1/68* | (2006.01) |
| *A23L 2/52* | (2006.01) |
| *A23L 1/304* | (2006.01) |
| *A23L 2/38* | (2006.01) |
| *C02F 1/66* | (2006.01) |

(52) U.S. Cl.
CPC ................. *C02F 1/68* (2013.01); *A23L 1/304* (2013.01); *A23L 2/38* (2013.01); *A23L 2/52* (2013.01); *A23L 2/68* (2013.01); *C02F 1/66* (2013.01); *C02F 2209/06* (2013.01)

(58) Field of Classification Search
CPC .............. A23L 1/304; A23V 2200/06; A23V 2200/30; A23V 2250/1642; A23V 2250/1578; A23V 2250/161
USPC ............................................ 426/74, 66, 590
See application file for complete search history.

(56) References Cited

U.S. PATENT DOCUMENTS

| | | | |
|---|---|---|---|
| 3,734,742 A | 5/1973 | Morse et al. | |
| 6,569,477 B2 * | 5/2003 | Lederman .............. | A23G 3/346 426/443 |

(Continued)

FOREIGN PATENT DOCUMENTS

| | | |
|---|---|---|
| CN | 101668438 | 3/2010 |
| DE | 19700368 | 7/1998 |
| JP | 2008245622 | 10/2008 |
| WO | WO2012038988 | 3/2012 |

OTHER PUBLICATIONS

Chinese Office Action for Application No. 201380022193.4, dated Jul. 29, 2015, 16 pages.

(Continued)

*Primary Examiner* — Helen F Heggestad
(74) *Attorney, Agent, or Firm* — K&L Gates LLP

(57) ABSTRACT

The invention concerns a production process of a zinc enriched drinking water, also called final water product, which, starting from a water matrix comprising drinking water, comprises, a first step of: Measuring the pH of the water matrix (step A), and then, in one order or the other, the steps of: Acidifying the water matrix (step B) in order to get a final water product having a pH lower than 7, and Adding zinc (step C) in a concentration comprised between 0.8 mg/l et 5 mg/l, so that sedimentation of zinc in the final water product is lower than 10% of soluble zinc over a period of 12 months at a maximum temperature of 40° C. The invention also concerns a zinc enriched drinking water composition and packaged zinc enriched drinking water.

12 Claims, 3 Drawing Sheets

(56) References Cited

U.S. PATENT DOCUMENTS

| | | | |
|---|---|---|---|
| 7,566,463 B2* | 7/2009 | Ayala | A61K 31/19 424/679 |
| 7,785,642 B2 | 8/2010 | Kaehne | |
| 2003/0049352 A1 | 3/2003 | Mehansho et al. | |
| 2010/0143573 A1* | 6/2010 | Godber | A23L 2/52 426/648 |

OTHER PUBLICATIONS

International Search Report for International Application No. PCT/EP13/053756 dated Apr. 9, 2013.

International Written Opinion for International Application No. PCT/EP13/053756 dated Apr. 9, 2013.

* cited by examiner

PRODUCTION PROCESS FOR A ZINC ENRICHED DRINKING WATER, COMPOSITION AND PACKAGED WATER

CROSS REFERENCE TO RELATED APPLICATIONS

The present application is a National Stage of International Application No. PCT/EP2013/053756, filed on Feb. 26, 2013, which claims priority to European Patent Application No. 12157303.4, filed Feb. 28, 2012, the entire contents of which are being incorporated herein by reference.

FIELD OF THE INVENTION

The present invention relates to a production process for a zinc enriched drinking water for human consumption.

The invention also relates to a zinc enriched drinking water composition and to a packaged zinc enriched drinking water.

BACKGROUND

Today it is usual to add minerals in water to be bottled for human consumption.

Usually, bottled waters are enriched in various minerals and ingredients: calcium, magnesium, bicarbonates, sodium, sulfate . . . etc, according to the nutritional and taste properties that we want the water to have.

If it is known to add different ingredients in a water to be bottled, but as of today there is very few zinc enriched drinking water on the market.

The currents zinc enriched beverages are usually not considered as water as they contain sugar.

Zinc is an essential trace element for human being and has an important role in the organism, especially because it activates lots of enzymes. In particular, zinc operates in:

Protein synthesis and thus in growth, in cells regeneration, in reproduction, in fertility, in healing, in peel aspect and in immunity Hormone synthesis of whom insulin and use of carbohydrates, flavors assessment and color vision.

Generally zinc is found in small amount in a number of foods (oysters, meats, entrails, whole bread, eggs, fishes, dried vegetables) but poor manifold feedings can lead to zinc deficiency.

The Daily Recommended Intake (DRI) is about a 10 to 15 mg but varies if it is for a child (5 to 8 mg/d), a teenager (10 mg/d), a woman (8 mg/d) or a man (11 mg/d).

A zinc deficiency can lead to late growth, late sexual maturing, peel and flavor troubles, hair loss, late healing, and immunity troubles. During pregnancy, which is a critical period, zinc deficiency can lead to a risk of malformation of the fetus.

The World Health Organization has revealed a certain number of countries in which some high zinc deficiencies have been identified, especially for children and pregnant women. Among them, we can mention India, Pakistan or Nigeria.

A zinc fortification is then to be considered in these countries. This fortification can be done by adding zinc in human food products. However, for practical and economical reasons it is preferable to add zinc in beverages and especially in drinking water for human consumption.

However, in some waters having specific pH characteristics, for example pH over 7.5 to 8.5, zinc will combine with water molecules to lead to insoluble hydroxides ($Zn(OH)_2$). This insoluble component will lead to non homogeneity of zinc concentration in water and to the presence of unpleasant sediment in the water.

Furthermore, in commonly used plastic bottle made, for example, of PET, once precipitated in insoluble zinc hydroxide, zinc will interact with the plastic walls of the bottle and will stick to the walls. It is then not possible for the person drinking said water to absorb zinc and the desired fortification effect will not occur.

Accordingly it is necessary to propose a solution allowing producing zinc enriched drinking water having increased zinc soluble form stability and compatible with usual conditions and time of storage and commercialization of packaged water.

SUMMARY OF THE INVENTION

In this respects, the invention provides a production process for zinc enriched drinking water, also called final water product, for human consumption having limited zinc sedimentation.

This process comprises, starting from a water matrix comprising drinking, a first step of:

Measuring the pH of the water matrix and then, in one order or the other, the steps of:

Acidifying the water matrix in order to get a final water product having a pH lower than 7

Adding zinc in a concentration comprised between 0.8 mg/l et 5 mg/l.

This process allows producing zinc enriched drinking water in which zinc is mainly under soluble form with a sedimentation below 10% of the soluble zinc during the time and under the conditions of average storage of the product on the shelves.

These average storage time and conditions have been defined as an average time of 12 months (one year) at a temperature up to 40° C. The packaged water then keeps the properties of the final water product during at least 12 months.

Thus, during this period of 12 months and in the previously mentioned conditions, the sedimentation of zinc in the packaged water is minimum (below 10% of the soluble zinc). Furthermore, as zinc remains in soluble form and in homogenous concentration in the water, there is no interaction with the bottle or container walls and zinc can then be absorbed in optimal way by the person drinking said water.

This is very interesting as it allows to do zinc fortification at a large scale and to be part of a health public effort.

The water matrix mainly comprises drinking water from drillings or other water springs. Said drinking water can be used directly (after different checks, tests and filterings) or can be partially or totally demineralized.

According to another characteristic, the step of acidifying water matrix is made by adding a strong acid to the water matrix. The advantage of using a strong acid is that the taste is not modified in a perceptible way due to the very small amount of acid that are added.

The strong acid is selected in the list of: sulfuric acid, phosphoric acid, hydrochloric acid. But, for practical reasons, acid sulfuric is preferred as it does not cause formation of insoluble salts.

The process of the invention comprises a step of adding zinc. Zinc is added as a salt chosen in the list: zinc sulfate, zinc chloride but other zinc salt could be used. The zinc salt can be anhydrous or hydrated.

Considering that a person drinks one liter of zinc enriched water a day, the quantity of zinc added in the final water product is chosen to cover about 5 to 30% of Daily Recommended Intake (DRI). The quantity of added zinc per liter of water allows participating in a significant way to a zinc fortification in the frame of a public health program fighting against zinc deficiency.

Complementary and optionally, the process according to the invention also comprises step of adding magnesium and/or calcium in a soluble salt form. This step takes place at whatever step of the process after initial measurement of the pH (step A).

For practical reasons, magnesium can be added at the same time as zinc during the zinc adding step. In this case, a mixture of zinc sulfate and of magnesium sulfate is made. This mixture is injected on line to the water matrix during the zinc adding step.

According to another characteristic, magnesium is preferably added as magnesium sulfate but can possibly also be added as magnesium chloride. Magnesium is added in a concentration between 10 mg/l and 375 mg/l.

As for calcium, it is added as calcium chloride in a concentration between 20 mg/l and 1 g/l.

The claimed process also comprises additional and optional step of adding bicarbonates. Bicarbonates are generally added lastly in the process thereby forming the final water product but they can be added earlier in the process, for example, before acidifying the water matrix.

In the current case, the addition of bicarbonates is the last step of the process and leads to the final water product.

The bicarbonates are added as sodium bicarbonates and/or potassium bicarbonates according to the taste characteristics that we want the water to have.

The quantity of added bicarbonates is variable and is between 5 mg/l and 500 mg/l.

The claimed process also comprises additional and optional step of adding bicarbonates. Bicarbonates are generally added lastly in the process thereby forming the final water product but can be added earlier in the process, for example, before acidifying the water matrix.

The production process of zinc enriched drinking water also comprises a step of verifying the pH of the final water product in order to ensure that said final water product has the necessary pH characteristics to avoid sedimentation of zinc.

According to another characteristic, the production process of the invention comprises a step of ozonation of the final water product before its packaging. This ozonation step, by gaseous ozone injection, aims to destroy microorganisms possibly present in the final water product and to present any potential microbial growth.

The present invention also concerns a zinc enriched drinking water composition comprising zinc, magnesium and/or calcium and having a pH lower than 7 so that sedimentation of zinc in the composition is lower than 10% of soluble zinc over a period of 12 months at a temperature up to 40° C.

The invention also relates to a packaged zinc enriched drinking water. This packaged zinc enriched drinking water comprises zinc enriched drinking water composition and protecting packaging (bottle, pouch and/or container).

The zinc enriched drinking water composition can indeed be packaged in different packaging according to its future use. One can then package said water in a bottle, for example in a plastic bottle, or in a pouch or even in a container for bigger volume.

BRIEF DESCRIPTION OF THE DRAWINGS

The different embodiments of the present invention will now be described in detail in reference to the appended drawings presenting by way of a simple diagram the production process of a zinc enriched drinking water as well as several graphs presenting sedimentation of zinc in water according to water pH.

DETAILED DESCRIPTION

Figure 1:
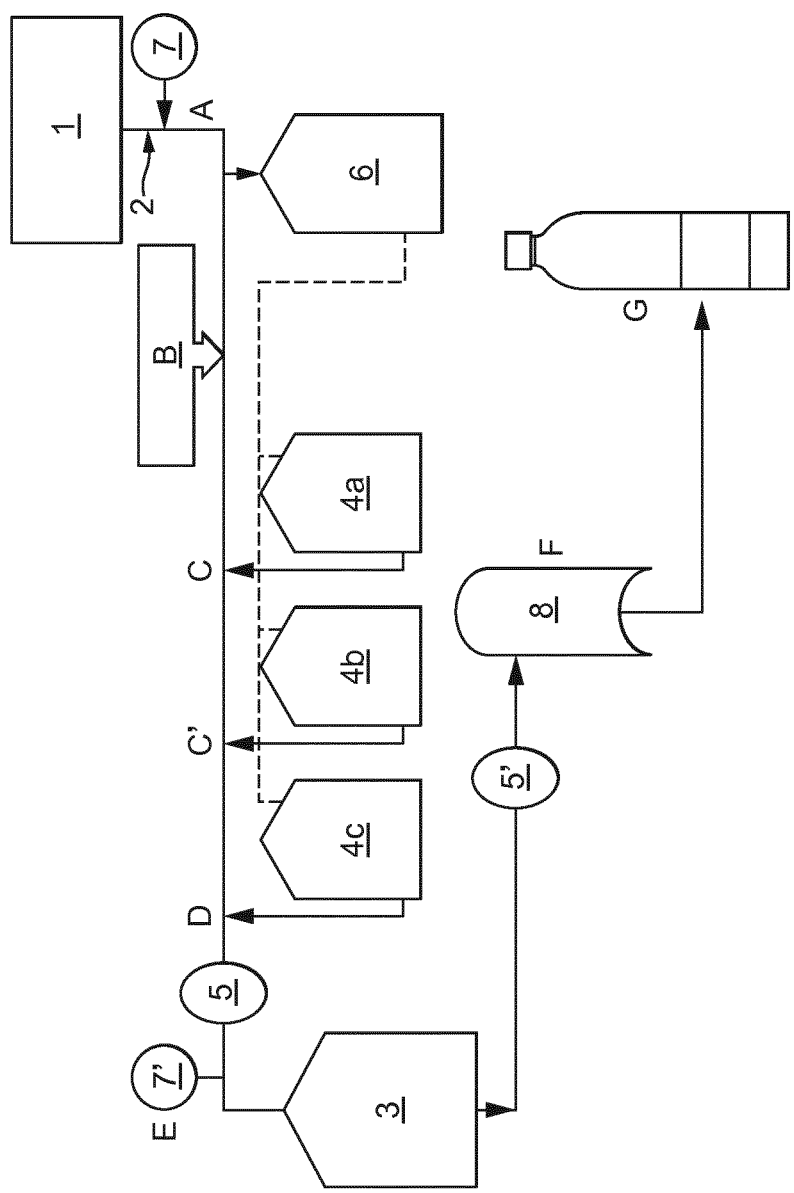
FIG. 1 presents a simple diagram of the production process according to the invention

As presented in FIG. 1, in the form of a simplified diagram, the production process of zinc enriched water according the present invention begins with water matrix. The water matrix mainly comprises drinking water from drilling or other water spring. Said drinking water can be used directly (after different checks and tests) or can be partially or totally demineralized.

Usually for water matrix, water resources located on the production site will be used. If the production site is located where there are many water springs, the water matrix will mainly be formed of spring water. On the other hand if the production site is in a location with very few water in the nature, the water matrix will mainly be formed of drinking water processed with mechanical and/or chemical filters. According to the filters used, the drinking water will be totally or partially demineralized.

Thus the water matrix comprises drinking water that is used directly or used after being partially or totally demineralized according to local resources.

Hence the water matrix can have very different chemical composition according to the drinking water that is used. Therefore, the treatments and the added ingredients/minerals will be different in their nature and/or quantity.

The water matrix is first stored in a tank 1. Then it flows through a water pipeline 2 and arrives to a second tank, remineralized water tank 3, storing the final water product.

Along this pipeline 2 are located several minerals tanks 4a, 4b, 4c containing ingredients and/or minerals which, after dosing, are directly injected on line in the water pipeline. A mixing of the water matrix in the water pipeline then occurs to ensure homogenous dilution of the ingredient and/or mineral in the water matrix.

More mineral tanks can be used according to the number of ingredients and/or minerals to be added to the water matrix.

Once all the minerals and/or ingredients have been injected in the pipeline, the final product is store in the remineralized water tank 3 where it can be mixed using mechanical means. For example, mechanical mixing means can be a rotary fan.

Along the pipeline 2, one or several filters can be disposed to retain possible foreign elements contained in the water. For example, a hum filter 5 is placed on the pipeline after all the minerals and ingredient have been added and before the remineralized water tank 3.

A mineral preparation tank 6 taking small amount of water from pipeline 2 is used to prepare concentrated mineral solutions which are then after stored in the different minerals tank 4a to 4c. One mineral solution is made at a time and then stored in a mineral tank before injection of a mineral dose in the water flowing in the pipeline.

The first step of the production process, step A consists of measuring the pH of the water matrix. This measurement will allow, according to the ingredient/minerals that will be added in further steps of the process, to forecast the pH value of the final water product to ensure that it will not exceed predetermined value ensuring that zinc will remain in a soluble form in the final water product.

This pH measurement is made using a calibrated pH meter referenced 7.

According to the value of pH obtained and knowing the ingredients/minerals that will be added, it is possible to know if it is necessary or not to acidify the water matrix so that the pH of the final water product remains lower than 7.

Step B consists in acidifying the water matrix. The acidification extent will depend on the characteristics of the water matrix, especially pH value, and on the ingredients/minerals that will be added to obtain the final water product.

Step B can be done in several ways.

For example, it can be done by adding a strong acid to the water matrix. A strong acid is one that completely ionizes in water, i.e. in water yielding the strong acid HA dissolves completely in one proton $H^+$ and the conjugated base $A-$ The strong acid is chosen in the list of sulfuric acid, phosphoric acid and hydrochloric acid.

Preferably, sulfuric acid is added to the water matrix because the added quantities of acid are very small, around 20 mg/l, and therefore have no effect on the taste of the final water product. Furthermore, the used of sulfuric acid does not lead to the formation of insoluble salts.

The following step of the process is the step of adding zinc, step C. This step allows enriching the water matrix with soluble zinc.

During step C, zinc is added in a concentration between 0.8 and 5 mg/l. Considering that a person drinks one liter of zinc enriched drinking water, the quantity of zinc added in the water matrix allows to cover around 5 to 30% of Daily Recommended Intake (DRI).

Zinc is added as zinc salt; for example, anhydrous or hydrated zinc sulfate, or anhydrous or hydrated zinc chloride. These zinc salts are simple to handle thereby simplifying the process.

It has to be noted that the quantity of zinc that is added (between 0.8 and 5 mg/l) has very few effect on the taste of the enriched water.

In addition to zinc, magnesium can optionally be added to the water matrix. Magnesium could, according to clinical studies, help in reducing high blood pressure. Furthermore, it helps in normalizing heart rhythm and has an effect on muscular contraction.

The step of adding magnesium, step C' can be done independently to step C of zinc adding or can be combined to it.

If magnesium is added in an independent step C', this step can be done before or after step C of adding zinc.

Usually, magnesium is added as magnesium salt, for example in the form of magnesium sulfate or magnesium chloride.

However, it is preferred to add magnesium in a single step while adding zinc. In this case, magnesium and zinc will be added together to the water matrix for example as a solution of magnesium sulfate and zinc sulfate.

The quantity of added magnesium is generally between 10 mg/l and 375 mg/l.

The process according to the invention also comprises an optional C" step (not presented in FIG. 1 but similar to step C') in which calcium is added. It can effectively be interesting to combine the effects of both zinc and calcium on growth.

Calcium is an essential mineral on many biological processes. Apart from being a major constituent of bones and teeth, calcium is essential for muscular contraction, impulse conduction, heart beating, blood coagulation, production of energy of immune function.

Furthermore, calcium is also necessary for giving taste quality of the water. In this domain, one can speak about construction of taste as it is the added ingredients and minerals that give the water its final taste.

Step C" can be done before or after step C of adding zinc.

In the present case, calcium is added as calcium chloride in a concentration between 20 mg/l and 1 g/l.

An additional and optional step of adding bicarbonates, step D, is also integrated in the production process of the invention. The bicarbonates are usually added as sodium bicarbonates and/or potassium bicarbonates. In the current diagram, they are added lastly giving the final water product which after treatment is packaged.

Bicarbonates are added in variable concentrations according to the water matrix and to the taste wanted for the final water product. Average concentration of added bicarbonates is about 5 mg/l to 500 mg/l.

The effect of bicarbonates is to raise the pH level of the solution. In the present case, it is then necessary to have had sufficient fall of pH during step B of acidifying the water matrix so that once bicarbonates are added, pH will not be higher than 7 when packaging the final water product.

If pH is higher than 7 when bottling the final water product, zinc will have a high risk to precipitate during storage of the bottled water and will not be anymore available in soluble form for the person drinking said water.

As can be understood from the preceding, step B, C, C', C" and D can be inverted between them. For example, step D of adding bicarbonates can take place before acidifying the water matrix or just after step C of adding zinc.

After having added all the minerals and ingredients, a final water product is then obtained.

A check of the pH is made in step E on the final water product by measuring pH in order to ensure that pH of final water product is lower than 7. This pH measurement is made by using a second pH meter referenced 7'.

Preferably the pH is comprised between 6.5 and 7.

If pH is below 6.5, according to certain local legislations, the final product will not be considered as water but as a beverage which has an important impact on commercialization and prizes.

If pH is higher than 7 at the time of bottling, pH of the final water product has a high risk to increase during storage to achieve the limit of 7.5 leading to at least partial zinc sedimentation. Zinc enriched drinking water will then not produce its effect of zinc fortification because of zinc sticking to the bottle walls that will not be absorbed by the person drinking said water. All the benefits of this zinc enriched drinking water will then be lost.

The final water product is stored in the remineralized water tank 3 where it is usually mixed in order to achieve homogenous dilution of the ingredients and minerals in the final water product.

The final water product is then after filtered by one or more filter 5'. At this stage of the process, the filters which are used are smaller than the ones used previously. The size of filter 5' is for example 0.22 μm.

An additional step of ozonation, step F, is proposed in order to destroy microorganism possibly present in the final water product and prevent potential microbial development.

The principal of ozonation is to oxidize microorganisms of the water. Ozone is a powerful disinfectant acting on bacterium and virus of the water.

The treatment is made by known ozonation methods using an ozonator 8.

Ozone treatment allows, even if it can remain expensive, to have a water treatment:

With no track in the water. As ozone naturally goes back to its original form (dioxygen), it does not leave any tracks in the water contrary to most of the other water treatment solutions.

With no secondary effect. Ozone does not lead to advent of organochlorinated products which can be carcinogenic.

With no effect on taste. Ozone has no effect on water taste; water is then not unpleasant to drink.

In step G, the zinc enriched drinking water is bottled.

As a general matter, the dosing of the different ingredients, salts and minerals is done by using concentrated solutions of the different ingredients, salts and minerals.

A mentioned, each ingredient or mineral is diluted in a mineral preparation tank 6 in order to form a concentrated solution. Each concentrated solution is stored in a mineral tank 4a to 4c. The required amount of the considered mineral/ingredient is directly injected on line in the water pipeline 2 and then mixed with the water matrix.

Figure 2:
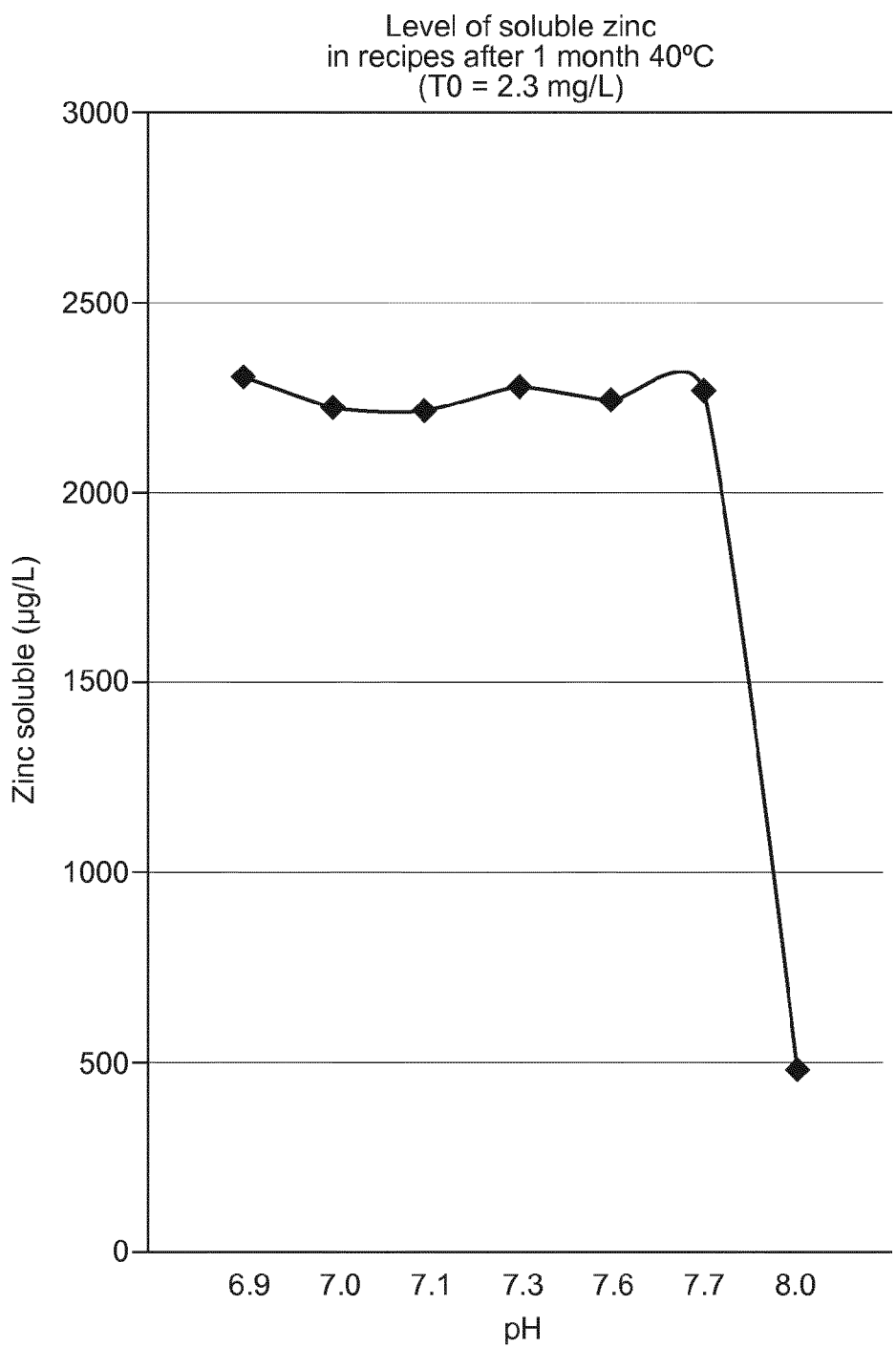
FIG. 2 presents a graph representing the change of soluble zinc quantity in water according to water pH, for a water comprising 2.3 mg/l of zinc.
Figure 3:
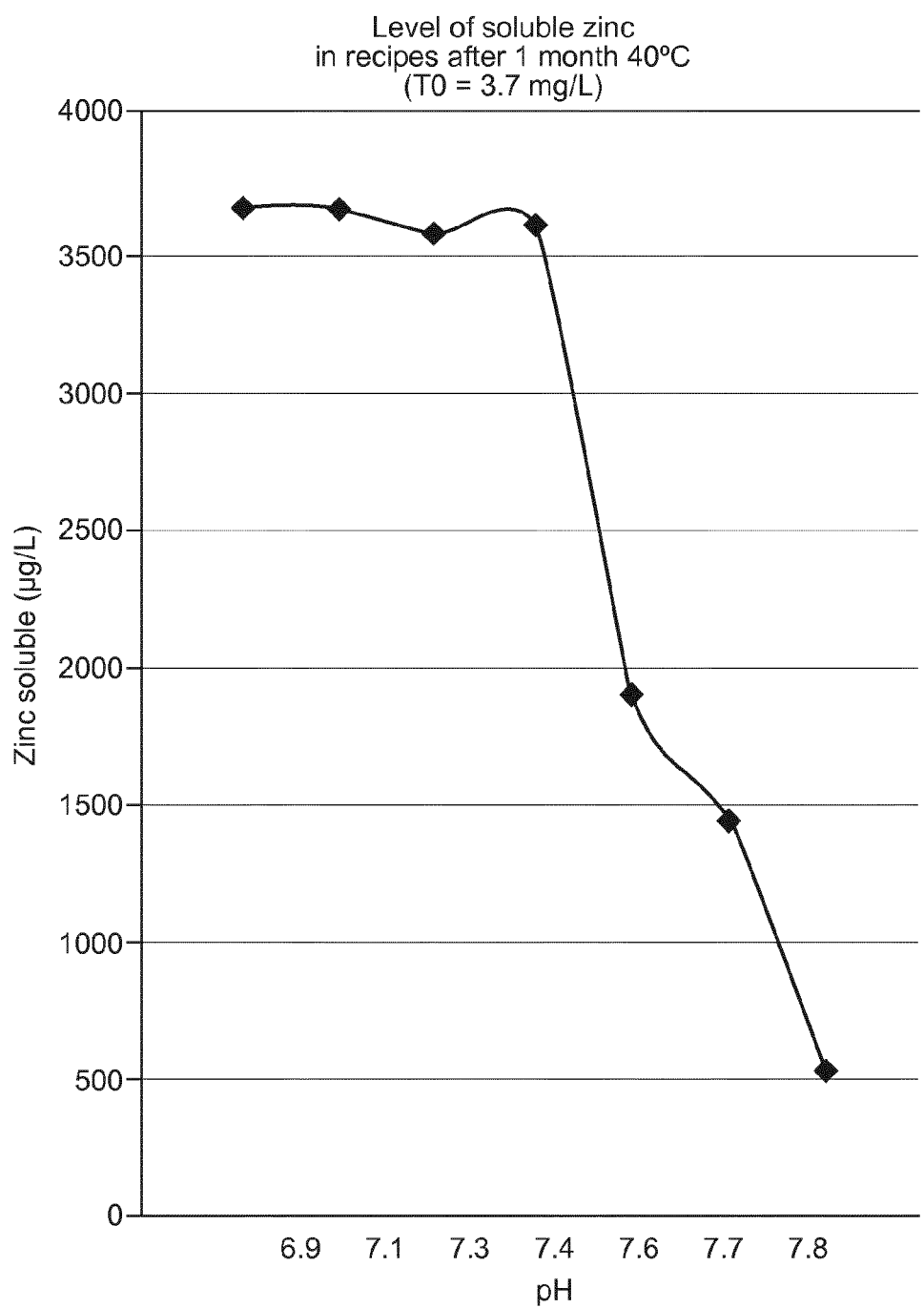
FIG. 3 presents a graph representing the change of soluble zinc quantity in water according to water pH, for a water comprising 3.7 mg/l of zinc.

FIGS. 2 and 3 present graphs representing the variation of soluble zinc quantity in water according to water pH, for waters comprising 2.3 mg/l and 3.7 mg/l of zinc after one month of storage at a temperature of 40° C.

From these graphs, it clearly appears that the pH of the final water product has an effect on zinc solubility in the final water product. Indeed, from a given pH (pH 7.7 for water containing 2.3 mg/l zinc and pH 7.5 for water containing 3.7 mg/l zinc), zinc solubility collapse. This means that zinc precipitates as sediment.

Absorption of zinc by the person drinking said water is then refrained and nearly null.

The pH management is very important in order to have zinc enriched drinking water in which zinc remains in a soluble form for absorption by the person drinking said water.

The invention is also related to a zinc enriched drinking water composition comprising:
between 0.8 and 5 mg/l of zinc,
between 10 and 375 mg/l of magnesium, and/or
between 20 and 1 g/l of calcium,
and having a pH lower than 7 so that sedimentation of zinc in said composition is lower than 10% of soluble zinc over a period of 12 months at a maximum temperature of 40° C.

This composition is obtained by using the described production process.

The invention is also related to a packaged zinc enriched drinking water comprising: a zinc enriched drinking water composition as presented above and a protecting package in the form of a bottle, a pouch and/or a container.

The zinc enriched drinking water composition is package in a protecting packaging in order to be stored and/or commercialized. The packagings that are used can be very different according the needs. Thus, the zinc enriched drinking water composition can be bottled, for example in plastic bottles, for example in PET or other compatible materials for storing water. The volume of the bottles can vary between 20 cl to 2 l.

It is possible to store the zinc enriched drinking water in a pouch or in a container have more important volumes, for example from 5 to 20 l, according to the use.

The invention claimed is:

1. A method for producing a zinc enriched drinking water which, starting from a water matrix comprising drinking water, the method comprising:
measuring the pH of the water matrix, and then;
acidifying the water matrix in order to get a final water product having a pH between 6.5 and 7; and
adding zinc in a concentration comprised between 0.8 mg/l and 5 mg/l,
so that sedimentation of zinc in the final water product is less than 10% of soluble zinc over a period of 12 months at a maximum temperature of 40° C.

2. The method according to claim 1, wherein the water matrix comprises partially or totally demineralized drinking water.

3. The method according to claim 1, in which the step of acidifying the water matrix is made by adding a strong acid to the water matrix.

4. The method according to claim 3, in which the strong acid is selected from the group consisting of sulfuric acid, phosphoric acid and hydrochloric acid.

5. The method according to claim 1, wherein zinc is added in the form of a zinc salt.

6. The method according to claim 1, comprising adding magnesium and/or calcium.

7. The method according to claim 1, wherein magnesium is added at the same time as zinc during zinc adding step.

8. The method according to claim 1, wherein magnesium is added as magnesium sulfate or magnesium chloride in a concentration between 10 mg/l and 375 mg/l.

9. The method according to claim 1, wherein calcium is added as calcium chloride in a concentration between 20 mg/l and 1 g/l.

10. The method according to claim 1, comprising adding bicarbonates, as sodium bicarbonates and/or potassium bicarbonates.

11. The method according to claim 1, comprising a step of verifying the final water product pH.

12. The method according to claim 1, comprising a step of ozonation of the final water product before its packaging.

* * * * *